United States Patent [19]

Heitz et al.

[11] Patent Number: 4,866,154

[45] Date of Patent: Sep. 12, 1989

[54] AROMATIC POLYESTER FROM SUBSTITUTED HYDROQUINONE AND BIPHENYL DICARBOXYLIC ACID

[75] Inventors: Walter Heitz, Kirchain; Hans-Werner Schmidt, Marburg, both of Fed. Rep. of Germany

[73] Assignee: Bayer Aktiengesellschaft, Leverkusen-Bayerwerk, Fed. Rep. of Germany

[21] Appl. No.: 226,625

[22] Filed: Aug. 1, 1988

[30] Foreign Application Priority Data

Aug. 15, 1987 [DE] Fed. Rep. of Germany ....... 3727254

[51] Int. Cl.$^4$ .............................................. C08G 63/18
[52] U.S. Cl. ................................ 528/190; 528/176; 525/437; 525/439
[58] Field of Search .............. 525/437, 439; 528/176, 528/190

[56] References Cited

U.S. PATENT DOCUMENTS 4,663,422  5/1987  Inoue et al. ......................... 528/176

*Primary Examiner*—John Kight
*Assistant Examiner*—T. Mason
*Attorney, Agent, or Firm*—Connolly & Hutz

[57] ABSTRACT

This invention relates to new aromatic polyesters based on substituted 4,4'-biphenyl dicarboxylic acids and substituted hydroquinones, to a process for their preparation from hydroquinone derivatives and terephthalic acid and to their use for the preparation of molecularly reinforced polymers.

4 Claims, No Drawings

AROMATIC POLYESTER FROM SUBSTITUTED HYDROQUINONE AND BIPHENYL DICARBOXYLIC ACID

This invention relates to new aromatic homo-polyesters based on substituted 4,4'-biphenyl dicarboxylic acids and substituted hydroquinones 4,4'-biphenyldiols and substituted terephthalic acids, substituted 4,4'-binaphthyl-dicarboxylic acids and substituted hydroquinones as well as 4,4'-binaphthyldiols and substituted terephthalic acids and to a process for their preparation from hydroquinone derivatives and terephthalic acid and to their use for the preparation of molecularly reinforced polymers.

It is known that different polymers are generally not capable of forming molecular mixtures with one another or can only do so to a limited extent. Thus for example mixtures of two different polymers prepared at an elevated temperature separate into domains on cooling. This applies particularly to mixtures of liquid-crystalline polymers in other polymers.

Polyesters based on substituted 4,4'-biphenyl dicarboxylic acids and substituted hydroquinones are known (e.g. US-PS 3,786,022, 4,433,132 and 4,608,829, Journal of Polymer Science, Part C, Volume 25, 11–17, 1987) but the solubility of the polyesters described there are not always quite satisfactory and the profile of the properties of mixtures of these polyesters with other polymers in many cases does not conform to the required level. Polyesters which carry trifluoromethyl substituents can only be prepared with difficulty.

It has now been found that special substituted polyesters obtained from substituted 4,4'-biphenyl dicarboxylic acids and substituted hydroquinones 4,4'-biphenyldiols and substituted terephthalic acids, substituted 4,4'-binaphthyl-dicarboxylic acids and substituted hydroquinones as well as 4,4'-binaphthyldiols and substituted terephthalic acids are much more readily miscible with many other polymers and more compatible and form homogeneous solutions and mixtures with one another over a wide temperature range of from $-30°$ to $250°$ C., preferably $-30°$ to $150°$ C.

The present invention therefore relates to new polyesters corresponding to formula (I)

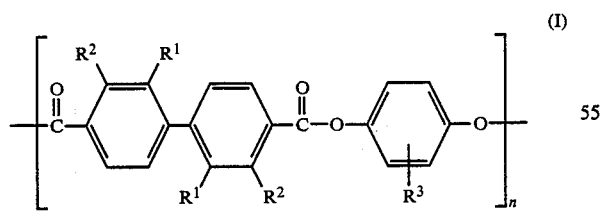
(I)

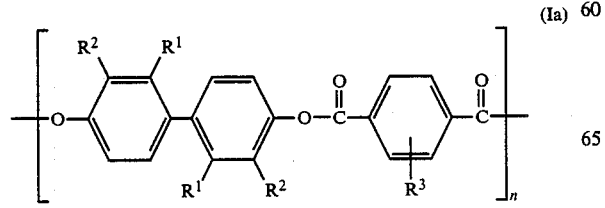
(Ia)

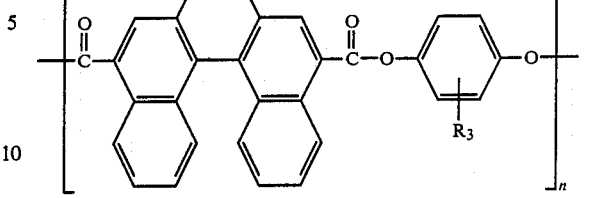
(Ib)

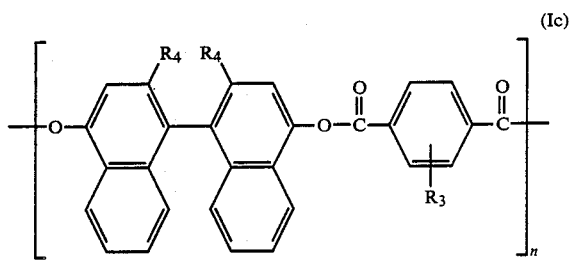
(Ic)

in which
R$^1$ stands for phenyl, C$_1$ to C$_4$ alkyl or an arylalkyl, arylalkyl ether or alkylaryl thioether group having a straight chained alkyl moiety containing 2, 3, 4, 5, 6, 7, 8, 9 or 10 atoms, the ω-carbon atom at the end of the chain carrying an unsubstituted aryl moiety containing 6 to 24 carbon atoms, R$^2$ stands for hydrogen or together with R$^1$ forms a condensed aromatic 6 membered ring, R$^3$ stands for halogen, C$_1$ to C$_4$ alkyl or an arylalkyl, arylalkyl ether or alkylaryl thioether group having a straight chained alkyl moiety containing 2, 3, 4, 5, 6, 7, 8, 9 or 10 atoms, the ω-carbon atom at the end of the chain carrying an unsubstituted aryl moiety containing 6 to 24 carbon atoms, with the proviso that when R$^1$ stands for methyl or ethyl, R$^3$ must stand for t-butyl or phenyl, and R$^4$ stands for hydrogen and R$^1$ and n stands for an integer with a value from 5 to 2000.

The groups denoted by R$^1$ and R$^3$ are preferably methyl, ethyl, propyl, isopropyl, butyl, isobutyl, tertiary butyl, phenyl or groups corresponding to formulae (II) to (VII) and R$^3$ may in addition stand for chlorine or bromine:

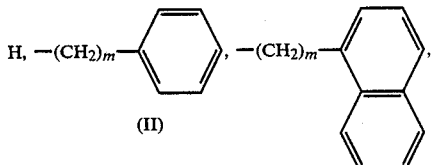

(II)           (III)

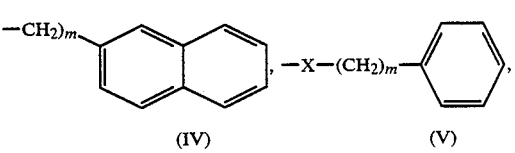
(IV)           (V)

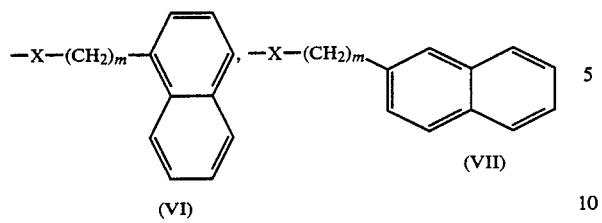

wherein
m stands for the number 2, 3, 4, 5, 6, 7, 8, 9 or 10, most preferably the number 2 or 3, and
X stands for oxygen (O) or sulphur (S).

The group denoted by $R^2$ is preferably hydrogen.

$R^1$ most preferably stands for $C_1$ to $C_4$ alkyl, $R^2$ for hydrogen and $R^3$ for tertiary butyl or phenyl.

The new polyesters have molecular weights $M_n$ of from 2500 to $10^6$, preferable from 5000 to 500,000.

The invention further relates to a process for the preparation of the polyesters corresponding to formula (I)

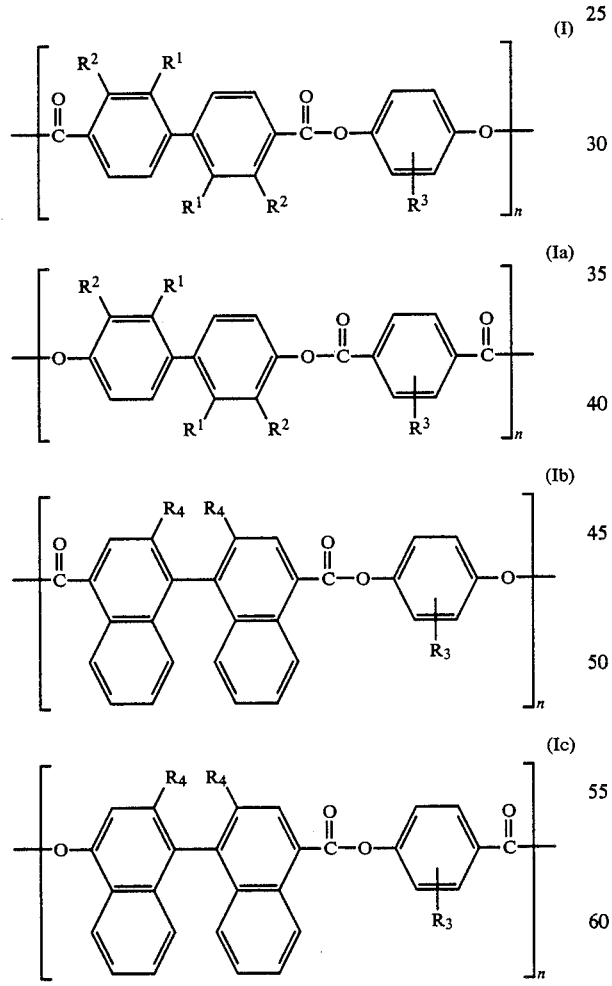

wherein
$R^1$ stands for phenyl, $C_1$ to $C_4$ alkyl, an arylalkyl, arylalkyl ether or alkylaryl thioether group having a straight chained alkyl moiety containing 2, 3, 4, 5, 6, 7, 8, 9 or 10 atoms, the ω-carbon atom at the end of the chain carrying an unsubstituted aryl moiety containing 6 to 24 carbon atoms and phenyl, $R^2$ stands for hydrogen or together with $R^1$ forms a condensed aromatic 6 membered ring, $R^3$ stands for halogen, $C_1$ to $C_4$ alkyl, or an arylalkyl, arylalkyl ether or alkylaryl thioether group having a straight chained alkyl moiety containing 2, 3, 4, 5, 6, 7, 8, 9 or 10 atoms, the ω-carbon atom of which at the end of the chain carries an unsubstituted aryl moiety containing 6 to 24 carbon atoms, with the proviso that when $R^1$ stands for methyl or ethyl, $R^3$ must stand for t-butyl or phenyl, and n stands for an integer with a value from 5 to 2000, characterised in that hydroquinones corresponding to formula (VIII)

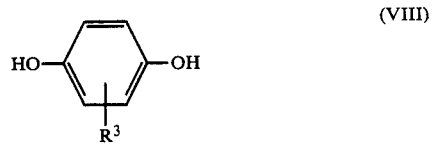

in which $R^3$ has the meaning indicated for formula (I) are reacted with (a) substituted 4,4'-biphenyl dicarboxylic acid derivatives such as the halides corresponding to formula (IX)

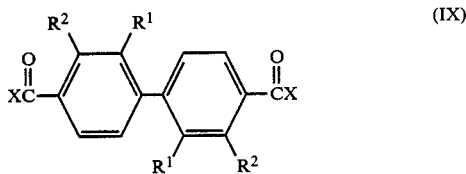

in which
X stands for a halogen such as Cl or Br and $R^1$ and $R^2$ have the meanings indicated for formula (I)

optionally in conventional organic solvents at temperatures from 0° to 250° C., preferably from 20° to 150° C., in the presence of optionally equivalent quantities of a tertiary amine (based on the 4,4'-biphenyl dicarboxylic acid derivative corresponding to formula (IX), or (b) acylated hydroquinones corresponding to formula (VIIIb)

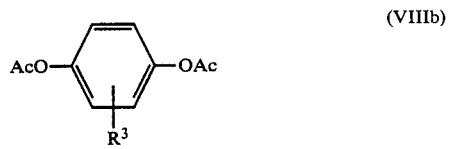

in which
the group $R^3$ has the meaning indicated for formula (I) and
Ac stands for $C_1$ to $C_{10}$-CO are reacted with a 4,4'-biphenyl carboxylic acid corresponding to formula (IXa)

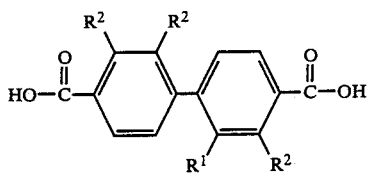 (IXa)

in which
R[1] and R[2] have the meanings indicated for formula (I)
optionally in conventional organic solvents at temperatures from 50° to 350° C. or in the melt without solvents at temperatures from 50° to 400° C., or (c) hydroquinones corresponding to formula (VIII) are reacted with esters, preferably aryl esters of 4,4'-biphenyl dicarboxylic acid corresponding to formula (IXb)

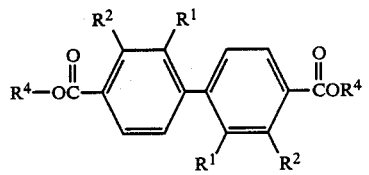 (IXb)

in which
R[1] and R[2] have the meanings indicated for formula (I) and
R[4] stands for $C_1$ to $C_4$ alkyl, $C_6$ to $C_{24}$ aryl or $C_7$ to $C_{30}$ aralkyl or alkylaryl, preferably $C_6$ to $C_{24}$ aryl in the presence of conventional transesterification catalysts in conventional solvents, optionally under a vacuum of from 0.1 to $10^{-4}$ bar.

The preparation for polyesters of formulas Ia, Ib, Ic is analogue.

The conventional organic solvents used for methods (a), (b) and (c) may be, for example, chlorinated hydrocarbons such as carbon tetrachloride, perchloroethylene, chloroform, dichloromethane, aromatic solvents such as toluene, diphenyl ether, chloronaphthalene or diphenyl sulphone, ketones such as acetone, butanone, etc..

When method (a) is employed, tertiary amines such as pyridine, triethylamine, etc. may be present in at least the equivalent quantity, based on the terephthalic halide. The tertiary amines may also be used as solvent.

The solution of the 4,4'-biphenyl dicarboxylic acid dihalide, e.g. in toluene, is introduced dropwise into the solution of the substituted hydroquinone in e.g. toluene, and the reaction mixture is then heated e.g. to temperatures of from 100° C. to 250° C. for one hour. The polymer is filtered off and freed from organic solvents and if necessary from salts (e.g. when a tertiary amine is present) by washing with water and alcohol (e.g. methanol). If the reaction is carried out in the presence of a tertiary amine, the reaction temperature employed is from 80° to 120° C.

If method (Ic) is employed, a conventional catalyst capable of influencing reactions should be used in quantities of from 0.001 to $0^1$ mol, based on the quantity of 4,4'-biphenyl dicarboxylic acid ester of formula (IXb) in the reaction mixture. The conventional transesterification catalysts used include e.g. metal salts and compounds such as manganese acetate, zinc chloride, titanium tetrapropylate, tindibutyl dilaurate and catalyst combinations such as zirconium tetrapropylate/4-dimethylamino pyridine or metals such as magnesium. The reaction may be carried out in high boiling solvents such as naphthalene methyl ether but is preferably carried out without solvents. The reaction components are heated for 1 to 5 hours to temperatures of about 300° C., preferably to a temperature just below the melting point of the polymer which is in process of formation, and the reaction mixture is after-condensed under reduced pressure at 280° to 350° C. for 1 to 5 hours.

About 1 mol of 4,4'-biphenyl dicarboxylic acid (derivative) corresponding to formula (IX) is used per mol of hydroquinone of formula (VIII).

The polymerization reactions (a), (b) and (c) may be carried out in the usual manner.

The polymers according to the invention may be classified as liquid-crystalline polymers but unlike known liquid crystalline polymers, they are not highly crystalline, difficultly soluble or incompatible with other polymers.

The polymers according to the invention may in fact be dissolved in other polymers (as molecular dispersions) in quantities of from 0.1 to 50% by weight, preferably 0.1 to 10% by weight (based on the other polymer with which they are to be mixed).

The polymers according to this invention may be incorporated in numerous other polymers, e.g. in thermoplasts such as polycarbonates, polyepoxides, ABS, macrolon, polyphenylene sulphides (e.g. Ryton ®, Tedur ®), polyether ether ketones, polyamides, polyesters, polyethylene, PVC, polyurethanes, acrylonitrile-butadiene-nitrile rubbers (NBR), rubbers and copolymers such as ethylenevinyl acetate, etc..

The polymers according to the invention may be incorporated by heating them to elevated temperatures of up to about 400° C. together with the polymers with which they are to be mixed, e.g. after grinding. A homogeneous mixture (alloy) is then obtained on cooling to room temperature.

The polymer mixtures prepared from the polymers according to the invention have excellent dimensional stability under heat over a wide temperature range extending from −100° C. to about 200° C. and high notched impact strength and moduli of elasticity, high scratch resistance and excellent shear strength.

The polyesters according to the invention corresponding to formula (I) may be dissolved, e.g. in a monomer such as styrene, methyl styrene, methyl methacrylate, epoxides, diisocyanate/diol systems or monomer mixtures such as styrene/acrylonitrile, etc. and the solution may then be polymerised. Polymerisation of the monomer is carried out under the usual conditions, vinyl monomers being polymerised by the addition of radical initiators, epoxides by the addition of polyamines and diisocyanate/diol systems by the addition of tin catalysts. A good polymer/polymer mixture is obtained. Mixing may also be carried out by means of a common solvent or mixture of solvents.

By virtue of their combination of properties, such mixtures are suitable for numerous applications, e.g. the preparation of materials, injection moulded products, foils, films, fibres, threads, etc..

Mixtures of the polyesters with polycarbonates such as Makrolon ® are distinguished e.g. by a marked increase in the E-modulus compared with that of the pure polycarbonate.

EXAMPLES

The 4,4'-biphenyl dicarboxylic acids and their derivatives required for the preparation of the polyesters of formula (I) according to the invention and the substituted hydroquinones required for the process are known and/or may be prepared by known methods.

4,4'-biphenyl dicarboxylic acid (derivatives), for example, may be prepared according to J. Polymer Sci., Polymer Chem. Ed. 16, 3151 (1978), Ber. Dtsch. Chem. Ges. 73, 898 (1940), etc..

Substituted hydroquinones may be prepared, for example, according to Makromol Chem. 37, 198 (1960).

The preparation of 2,2'-bis(methyl)-4,4'-biphenyl dicarbonyl chloride by the thionyl chloride method:

15 g (56 mmol) of 2,2'-bis(methyl)-4,4'-biphenyl dicarboxylic acid, 90 ml (1.24 mol) of thionyl chloride and two drops of DMF were refluxed under nitrogen for 5 hours. Excess thionyl chloride was distilled off in a vacuum. The solid residue was recrystallized from anhydrous methyl heptane, 13.8 g (80% of Th.), m.p. 92°–93° C.

Preparation of the polyesters:

The polyesters may be prepared by polycondensation, either in the molten solvent free state or in solution.

EXAMPLE (a)

Preparation of a polyester of 2,2'-bis(methyl)-4,4'-diphenyldicarbonyl chloride and t-butyl hydroquinone in the melt.

2.5201 g (8.204 mmol) of 2,2'-bis-(methyl)-4,4'-biphenyldicarbonyl chloride and 1.3636 g (8.204 mmol) of t-butyl hydroquinone were added together under an inert gas atmosphere (e.g. $N_2$) in a flame dried flask with magnetic stirrer. The flask was equipped with a bubble counter and a slow stream of inert gas was passed through the flask. The contents were slowly heated to 100° C. and evolution of HCl set in. When the reaction mixture formed a homogeneous melt, it became increasingly more viscous. The melt solidified after 1 to 2 hours and was then kept at 100° C. for 10 hours. The temperature was then kept at 260° C. for 3 hours and thereafter at 260° C. for a further 3 hours under a pressure of 5 Pa. The polyester was then dissolved in 40 ml of $CHCl_3$, filtered, precipitated with 600 ml of alcohol ($CH_3OH$) and filtered off. The polyester was again dissolved and precipitated and dried at 80° to 100° C. for 8 hours. Yield: 86% (of Th.), $\eta_{inh}$=1.38 dl/g.

When several batches were used for preparing this polyester, the inherent viscosities of the products obtained ranged from 1.38 to 3.04 dl/g.

EXAMPLE (b)

Preparation of the polyester by polycondensation in solution.

In a flame dried flask with magnetic stirrer, 2.5307 g (8.238 mmol) of 2,2'-bis-(methyl)-4,4'-biphenyl dicarbonyl chloride and 1.3694 g (8.238 mmol) of t-butyl hydroquinone, 2.5 ml of 1,1,2,2-tetrachloroethane (distilled over $P_2O_5$) and 3 ml of pyridine (distilled over KOH, kept over a molecular sieve) were added together under an inert gas atmosphere (e.g. $N_2$) which was at a slight excess pressure and the reaction mixture was kept at 120° C. for 20 hours. The polyester was precipitated in 600 ml of alcohol ($CH_3OH$), filtered off and dissolved in $CHCl_3$, again precipitated with alcohol ($CH_3OH$) and filtered off and dried at 80° to 100° C. and 5 Pa. Yield: 86% (of Th.). $\eta_{inh}$ 0.64 dl/g.

The inherent viscosities were determined at 45° C. in 4-chlorophenol at a concentration of 0.5 g/dl.

EXAMPLE (c)

Preparation of 1,1'-binaphthyl-4,4'-dicarboxylic acid chloride.

For the preparation of 1,1'-binaphthyl-4,4'-dicarboxylic acid 4,4'-dimethyl-1,1'-binaphthyl was used. This compound can be prepared according known process (see e.g. for the 2,2'-dimethyl substituted isomer N. Maigrot, et. al., Synthesis 317, (1985).

In a 4 liter steel autoclave with stirrer to 22.52 g (80 mmol) 4,4'-dimethyl-1,1'-binaphthyl and 71.52 g (0.24 mol) sodiumbichromate are added 600 ml water. It was stirred under an atmosphere of $CO_2$ for 17 hours at 230° C. (starting pressure 35 bar at room temperature) whereby the pressure raised up to 50 bar. The reaction mixture was extracted in alkaline nuclein with toluene and ether and with 6n and 3n HCl the 1,1'-binaphthyl-4,4'-dicarboxylic acid was precipitated and filtered off. (16.90 g=62% of theory, m.p. 222°–225° C.).

13.69 g (40 mmol) 1,1'-binaphthyl-4,4'-dicarboxylic acid, 150 ml (2.06 mmol) thionylchloride and 5 drops of dimethylformamide are refluxed 5 hours under $N_2$. Most of the excess thionylchloride was distilled off at normal pressure and the rest of it under oil-pump vacuum. The solid residue was treated with dried n-octane. (13.70 g, 90% of the theory).

Prevention of a polyester from 1,1'-dinaphthyl-4,4'-dicarboxylic acid chloride and tert. butylhydroquionone in solution.

In a dried 100 ml round flask with magnetical stirrer, oil bath or molten salt, reflux condensor and bubble counter 1.9090 g (5.034 mmol) 1,1'-binaphthyl-4,4'-dicarboxylic acid chloride and 0.7761 g (5.034 mmol) tert.-butylhydroquinone are mixed with 30 ml diphenylether under inert gas atmosphere (e.g. $N_2$). The mixture was heated up to 100° C. and the starting materials dissolved and the evolved HCl was removed by nitrogen. Within 45 hours the temperature was risen up to 260° C. Within this reaction time no more evolution of HCl could be detected (indicator-paper, $AgNO_3$-solution). The clear and viscous solution was diluted with 70 ml $CHCl_3$ and precipitated with methanol. The white-grey, fluffy polyester was dissolved in 100 ml $CHCl_3$ and purified by precipitating with methanol.

After a couple of hours of drying at 60° C., in the oil-pump vacuum the yield was 2.15 g (90% of theory).

Properties of the polyester:
solubility:
in $CHCl_3$ and THF about 7% by weight, viscosity, inh.
30° C., 0.5% in THF: 1.51 (dl/g).
Molecular weight (relative to polystyrene)
$M_n$ (GPC): 71 000 (g/mol).
Glas temperature: 194°–196° C.
Liquid-crystalline properties at 270°–350° C.

We claim:
1. A polyester having recurring units of the formulae

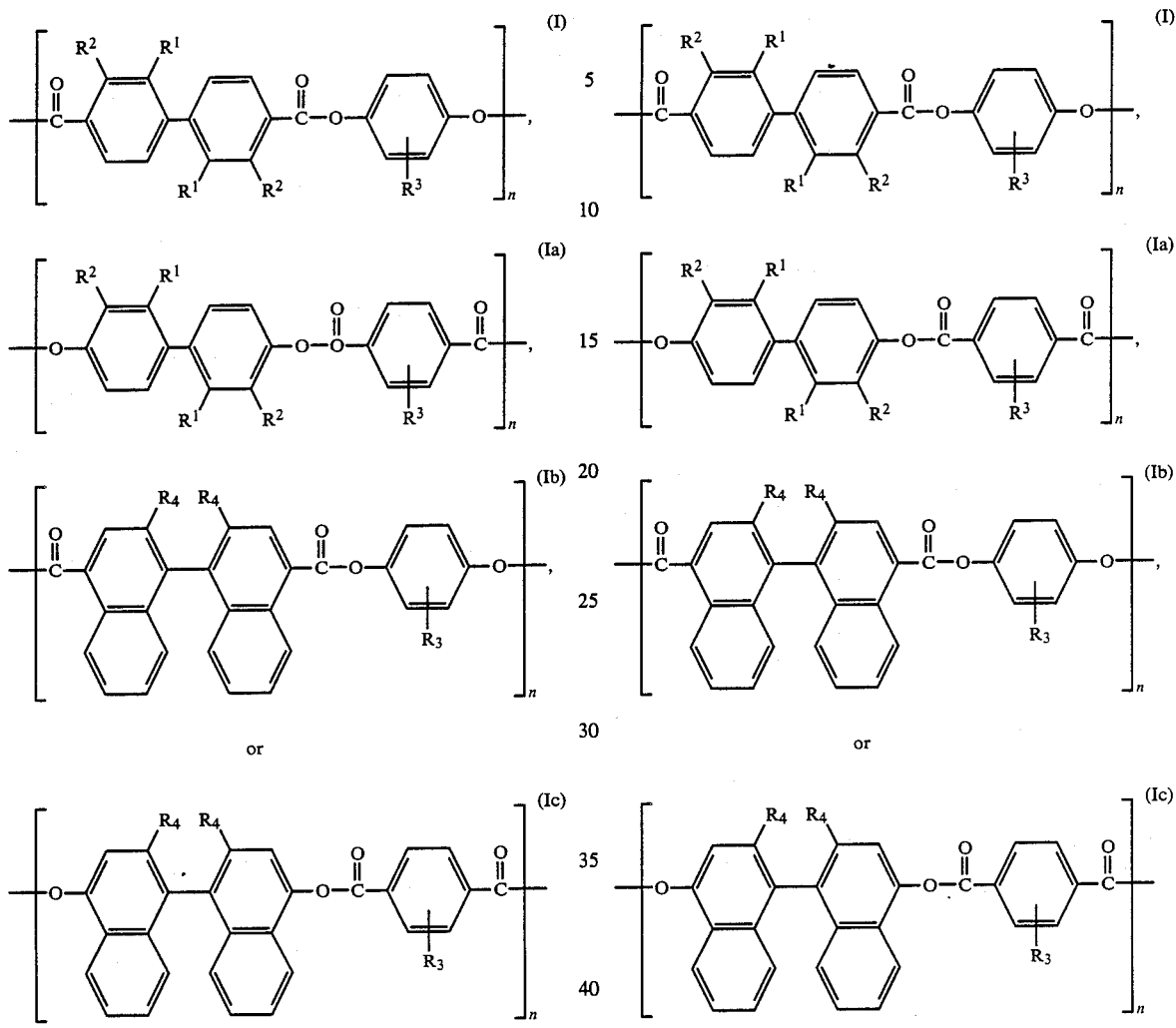

in which

R[1] represents phenyl, C₁ to C₄ alkyl or an arylalkyl, arylalkyl ether or alkylaryl thioether group having a straight chain alkyl moiety containing 2, 3, 4, 5, 6, 7, 8, 9 or 10 atoms, the carbon atom at the end of the chain carrying an unsubstituted aryl moiety containing 6 to 24 carbon atoms, and R[2] represents hydrogen or together with R[1] forms a condensed aromatic 6 membered ring, R[3] represents halogen, C₁ to C₄ alkyl or an arylalkyl, arylalkyl ether or alkylaryl thioether group having a straight chain alkyl moiety containing 2, 3, 4, 5, 6, 7, 8, 9 or 10 atoms, the ω-carbon atom of which at the end of the chain carries an unsubstituted aryl moiety containing 6 to 24 carbon atoms, with the proviso that when R[1] represents methyl or ethyl, R[3] must stand for t-butyl or phenyl, and R[4] represents hydrogen or R[1] and n represents an integer with a value from 5 to 2000.

2. A process for the preparation of a polyester of the formulae in which

R[1] represents phenyl, C₁ to C₄ alkyl, an arylalkyl, arylalkyl ether or alkylaryl thioether group having a straight chain alkyl moiety containing 2, 3, 4, 5, 6, 7, 8, 9 or 10 atoms, the ω-carbon atom of which at the end of the chain carries an unsubstituted aryl moiety containing 6 to 24 carbon atoms and phenyl, R[2] represents hydrogen or together with R[1] forms a condensed aromatic 6 membered ring, R[3] represents halogen, C₁ to C₄ alkyl or an arylalkyl, arylalkyl ether or alkylaryl thioether group having a straight chain alkyl moiety containing 2, 3, 4, 5, 6, 7, 8, 9 or 10 atoms, the ω-carbon atom of which at the end of the chain carries and unsubstituted aryl moiety containing 6 to 24 carbon atoms, with the proviso that when R[1] represents methyl or ethyl, R[3] must represent t-butyl or phenyl, and n represents an integer with a value from 5 to 2000, characterized in that hydroquinones of the formulae

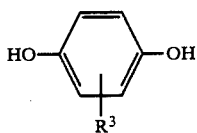
(VIII)

in which the group $R^3$ has the meaning indicated for formulae (I), (Ia), (Ib) and (Ic) are reacted with a substituted 4,4'-biphenyl dicarboxylic acid derivative in the presence of conventional transesterification catalysts in conventional solvents.

3. A process for the preparation of a polyester of the formulae

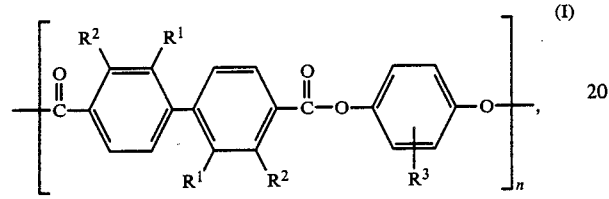
(I)

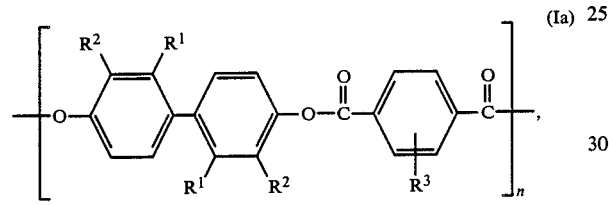
(Ia)

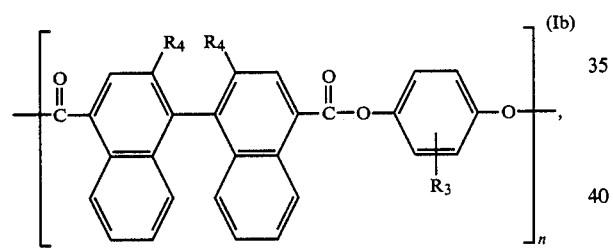
(Ib)

or

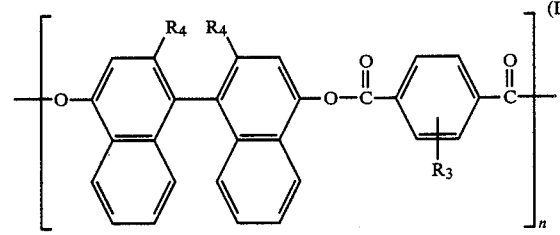
(Ic)

in which
$R^1$ represents phenyl, $C_1$ to $C_4$ alkyl, an arylalkyl, arylalkyl ether or alkylaryl thioether group having a straight chain alkyl moiety containing 2, 3, 4, 5, 6, 7, 8, 9 or 10 atoms, the $\omega$-carbon atom of which at the end of the chain carries an unsubstituted aryl moiety containing 6 to 24 carbon atoms and phenyl,
$R^2$ represents hydrogen or together with $R^1$ forms a condensed aromatic 6 membered ring,
$R^3$ represents halogen, $C_1$ to $C_4$ alkyl or an arylalkyl, arylalkyl ether or alkylaryl thioether group having a straight chain alkyl moiety containing 2, 3, 4, 5, 6, 7, 8, 9 or 10 atoms, the $\omega$-carbon atom of which at the end of the chain carries and unsubstituted aryl moiety containing 6 to 24 carbon atoms, with the proviso that when $R^1$ represents methyl or ethyl, $R^3$ must represent t-butyl or phenyl, and n represents an integer with a value from 5 to 2000, characterized in that acylated hydroquinones of the formula

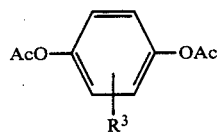
(VIIIb)

in which
$R^3$ has the meaning indicated for formulae (I), (Ia), (Ib) and (Ic) and
Ac represents $C_1$ to $C_{10}$-CO are reacted with a 4,4'-biphenyl carboxylic acid of the formula

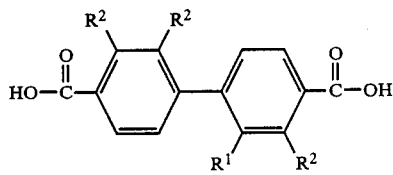

in which
$R^1$ and $R^2$ have the meaning indicated for formulae (I), (Ia), (Ib) and (Ic) in the presence of conventional transesterification catalysts in conventional solvents.

4. A process for the preparation of a polyester of the formulae

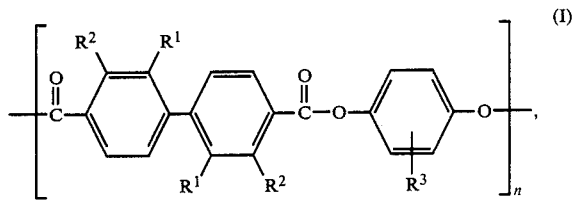
(I)

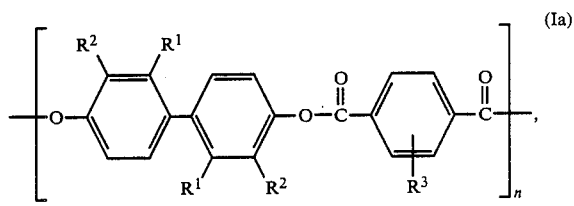
(Ia)

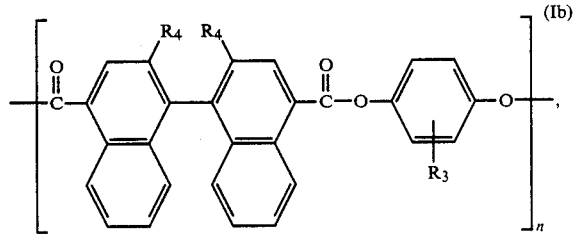
(Ib)

or

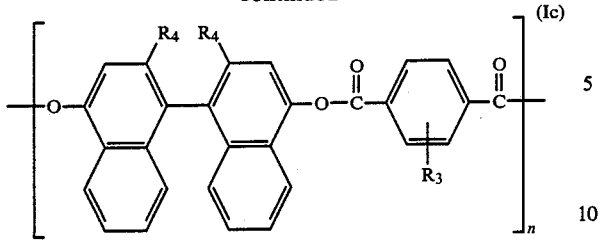 (Ic)

in which
R¹ represents phenyl, $C_1$ to $C_4$ alkyl, an arylalkyl, arylalkyl ether or alkylaryl thioether group having a straight chain alkyl moiety containing 2, 3, 4, 5, 6, 7, 8, 9 or 10 atoms, the ω-carbon atom of which at the end of the chain carries an unsubstituted aryl moiety containing 6 to 24 carbon atoms and phenyl, R² represents hydrogen or together with R¹ forms a condensed aromatic 6 membered ring, R³ represents halogen, $C_1$ to $C_4$ alkyl or an arylalkyl, arylalkyl ether or alkylaryl thioether group having a straight chain alkyl moiety containing 2, 3, 4, 5, 6, 7, 8, 9 or 10 atoms, the -carbon atom of which at the end of the chain carries and unsubstituted aryl moiety containing 6 to 24 carbon atoms, with the proviso that when R¹ represents methyl or ethyl, R³ must represent t-butyl or phenyl, and n represents an integer with a value from 5 to 2000, characterized in that hydroquionones corresponding to the formula

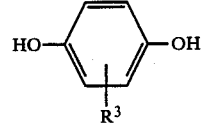 (VIII)

in which the group R³ has the meaning indicated for formulae (I), (Ia), (Ib) and (Ic) are reacted with esters in the presence of conventional transesterification catalysts in conventional solvents.

* * * * *

UNITED STATES PATENT AND TRADEMARK OFFICE
CERTIFICATE OF CORRECTION

PATENT NO. : 4,866,154
DATED : September 12, 1989
INVENTOR(S) : Inventors: Walter Heitz, Hans-Werner Schmidt It is certified that error appears in the above-identified patent and that said Letters Patent is hereby corrected as shown below:

Title page:

Add as an additional coinventor:--Martin Hohlweg, Frankfurt, Federal Republic of Germany--

Signed and Sealed this

Thirteenth Day of November, 1990

Attest:

HARRY F. MANBECK, JR.

*Attesting Officer*  *Commissioner of Patents and Trademarks*